Feb. 12, 1929.
T. M. HARDESTY
1,701,885
DRILL PIPE COUPLING
Original Filed Dec. 23, 1925
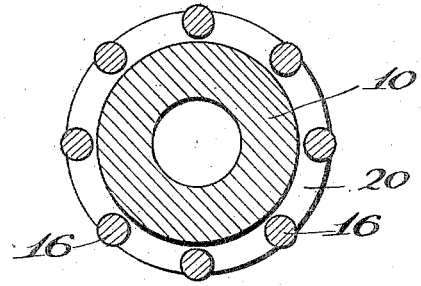
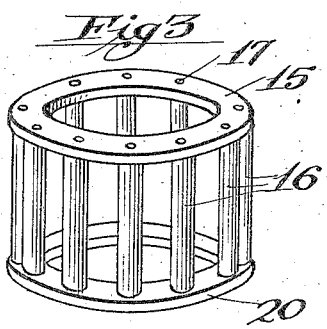
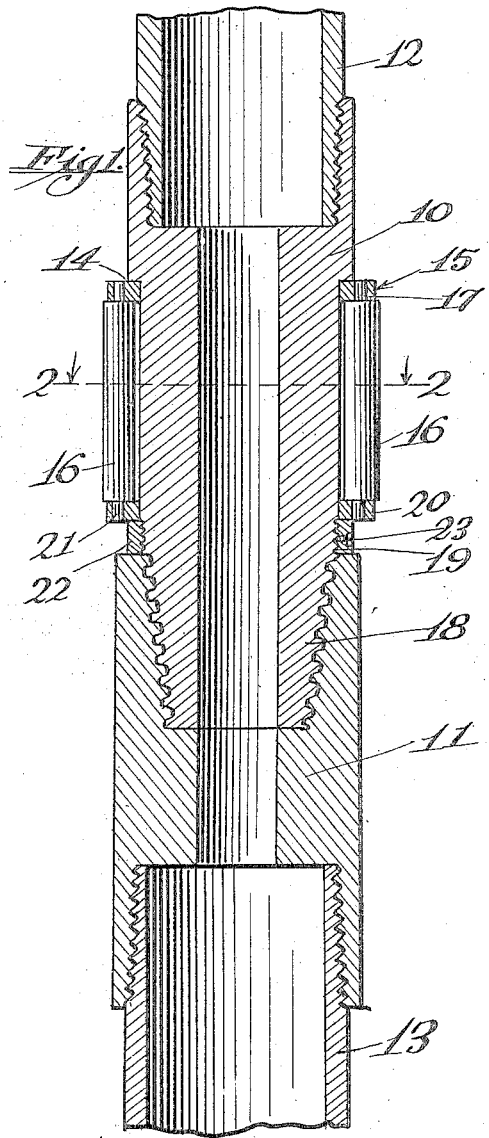
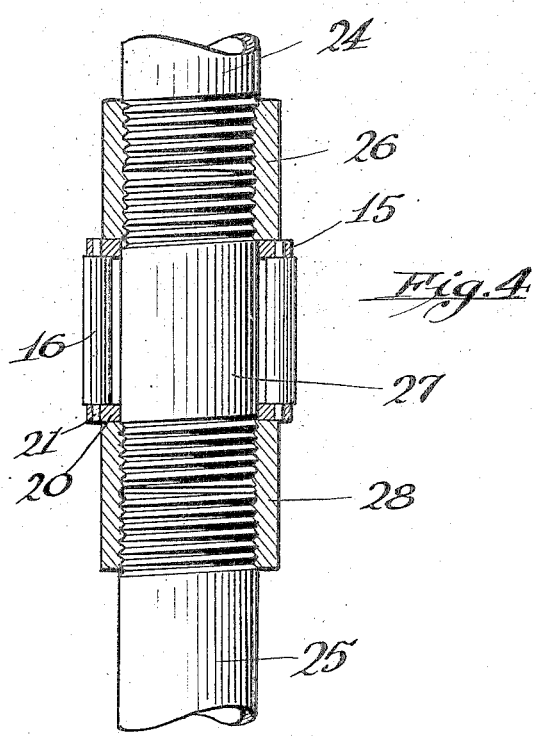
Inventor
Thomas M. Hardesty
by Hazard and Miller
Attorneys Patented Feb. 12, 1929.

1,701,885

UNITED STATES PATENT OFFICE.

THOMAS M. HARDESTY, OF LONG BEACH, CALIFORNIA.

DRILL-PIPE COUPLING.

Application filed December 23, 1925, Serial No. 77,272. Renewed July 9, 1928.

This invention relates to improvements in drill pipes and drill pipe tool joints used in drilling wells.

An object of the invention is to provide a drill pipe with an anti-friction bearing. In drilling wells to any considerable depth by a rotary drilling outfit, it very seldom happens that the well hole is absolutely straight. Consequently, the drill pipe frequently bears against the interior of the well casing during the drilling operations and will frequently wear holes in the casing or sufficiently weaken it so that it is very apt to collapse. By providing an anti-friction bearing on the drill pipe at suitable intervals, this wear of the casing is effectively prevented.

Another object of the invention is to provide an anti-friction bearing which is mounted upon a tool joint, so that it can thus be conveniently mounted upon the drill pipe and can be easily removed for repair or replacement purposes.

With the foregoing and other objects in view which will be made manifest in the following detailed description and specifically pointed out in the appended claims, reference is had to the accompanying drawings for an illustrative embodiment of the invention, wherein:

Figure 1 is a vertical section through a tool joint mounted on a drill pipe on which the anti-friction bearing of the preferred construction has been placed, Fig. 2 is a horizontal section taken on the line 2—2 of Fig. 1, Fig. 3 is a perspective view of the bearing, and Fig. 4 is a sectional view illustrating the anti-friction bearing as being mounted upon a coupling for drill pipe and constituting a slight modification of the invention.

Referring to the accompanying drawings wherein similar reference characters designate similar parts throughout, the invention is preferably embodied upon a tool joint consisting of a pin section 10 and a box 11 which connect the adjacent ends of adjacent sections of drill pipe 12 and 13. On the pin section 10 there is formed an external shoulder 14, against which is positioned a ring 15. Rollers 16 have their ends reduced to provide pintles 17 which are rotatable in the ring 15. Adjacent the threaded end 18 of the pin section there are formed threads 19. A second ring 20 is slipped onto the pin section and receives the pintles 21 formed on the lower end of each of the rollers. A locking ring 22 is threaded onto the threads 19, serving to lock the ring 20 in place. This locking ring may be locked against rotation or unscrewing by one or more set screws 23.

From the above described construction it will be readily appreciated that the bearing can be easily and quickly applied to the pin section and can be easily and quickly removed; also the rollers 16 which are rotatable about substantially vertical axes provide an anti-friction bearing, which when it engages the interior of the well casing will effectively prevent wear and also reduce the friction heretofore required to rotate the drill pipe. It will be noted that the bearing is of a larger diameter than any part on the drill pipe, so that it will always be caused to engage the interior of the well casing instead of other parts.

In the modification shown in Fig. 4, the bearing is embodied upon a coupling for drill pipe as distinguished from the tool joint. In this modification the adjacent ends of adjacent sections of drill pipe are illustrated at 24 and 25. Normally these ends are connected as by a single coupling member or collar 26. In placing the bearing thereon, a short section of drill pipe or a nipple 27 is positioned between the adjacent ends 24 and 25 and the collar 26 connects the upper end of the nipple 27 to the lower end of the section 24. This collar provides a shoulder for the upper ring 15 of the bearing, in which the pintles of the rollers 16 are mounted. A second collar 28 is threaded onto the lower end of the nipple 27 and serves to maintain the lower ring 20 in position. The second collar 28 also serves to connect the lower end of the nipple 27 to the drill pipe section 25. In this construction as well as that illustrated in Fig. 1 the bearing can be easily and quickly applied or removed and will effectively prevent wearing of the casing.

It will be understood that various changes in the detail of construction may be made without departing from the spirit or scope of the invention as defined by the appended claims.

I claim:

1. A pipe coupling for connecting drill pipe operating within a well casing, said pipe coupling having a circumferential series of vertical rollers forming an outside diameter larger than the remainder of the coupling and sufficiently smaller than the inside diameter of the well casing to provide for free passage of the flushing water and detritus, and rings in which the ends of said rollers are journaled.

2. A pipe coupling for connecting drill pipe operating within a well casing, said pipe coupling having an annular recess therein, a circumferential series of vertically disposed rollers within said recess and projecting to form an outside diameter for the coupling larger than that of the remainder of such coupling but sufficiently smaller than the interior of the well casing to provide for the free passage of the flushing water and detritus, and rings in which the rollers are journaled.

3. A pipe coupling for connecting drill pipe operating within a well casing, said pipe coupling having an annular recess therein, two vertically spaced apart rings mounted in said recess, rollers vertically disposed and journaled in said rings, said rollers extending beyond the outside diameter of the remainder of said coupling, there being left sufficient space between said rollers and the interior of the well casing to provide for the free passage of the flushing fluid and detritus.

In testimony whereof I have signed my name to this specification.

THOS. M. HARDESTY.